Feb. 10, 1959 F. H. CHASE 2,873,372

ELECTRIC CIRCUIT INTERRUPTERS

Filed Dec. 12, 1957

INVENTOR
F. H. CHASE
BY A. J. Kane
ATTORNEY

United States Patent Office 2,873,372
Patented Feb. 10, 1959

2,873,372

ELECTRIC CIRCUIT INTERRUPTERS

Fay H. Chase, Short Hills, N. J., assignor to Bell Telephone Laboratories, Incorporated, New York, N. Y., a corporation of New York Application December 12, 1957, Serial No. 702,346

4 Claims. (Cl. 250—36)

Figure 1:
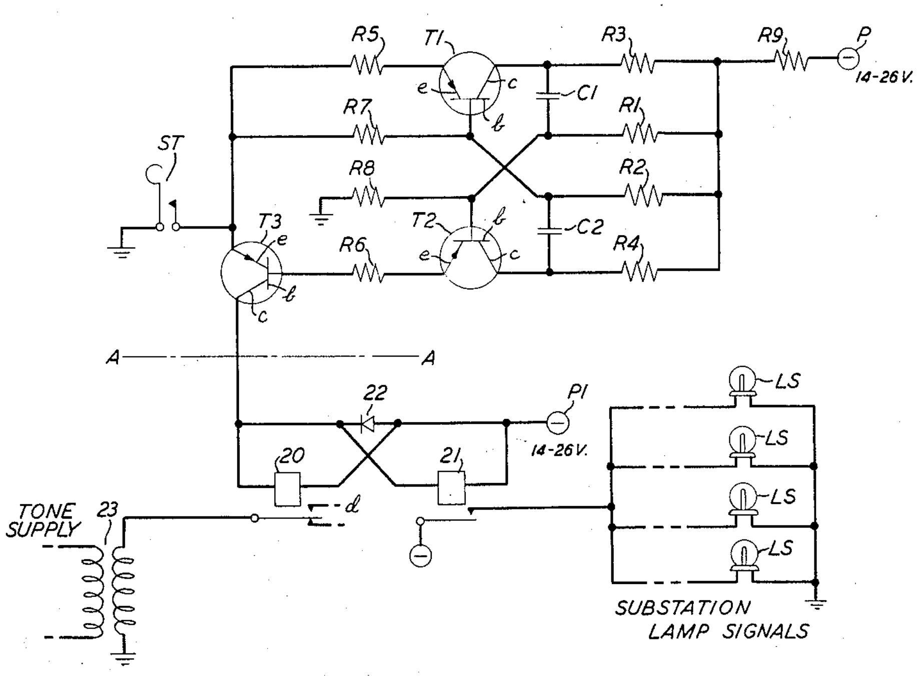

This invention relates to electric circuit interrupters and particularly to interrupters of the type used in the telephone plant for controlling the operation of visual and audible signals at subscriber stations.

In today's telephone plant the relay type interrupter finds extensive use. In known key telephone systems a two-relay chain interrupter with relays having slow release characteristics is used to flash and wink the lamp signals in subscriber telephone sets. A flashing lamp indicates a line with a call waiting to be answered and a winking lamp signifies an answered call with the distant party held waiting. In general, these relays are located on the subscriber's premises and are frequently found to generate noise of such magnitude as to necessitate acoustic insulation, an expedient which is only partially effective in eliminating the disturbance. Furthermore, because of contact current limitations individual relay contacts are used for each line served, and one interrupter serves no more than a group of five lines. Also, the timing intervals are subject to variations with supply voltage changes, relay adjustments and wear.

It is the object of this invention to provide a quietly operating interrupter which has the capability of serving large capacity loads and at the same time is free of the shortcomings of the relay type interrupter.

This object is attained in accordance with a feature of the invention by utilizing a transistorized multivibrator in combination with one or more mercury contact type relays to control the intermittent operation of visual and audible signals at telephone subscriber stations.

In the particular capacities for which the interrupters of this invention are especially suited it is essential that they respond immediately to a call for service and cease operating when not required. This characteristic of immediate response to service calls and of equally abrupt cessation of operation when a service call has been satisfied is attained, in accordance with another feature of the invention, by incorporating in the multivibrator circuit means which functions to stabilize the starting characteristics of the interrupter and, at the same time, to assure that the first driving pulse delivered thereby is of a proper predetermined length. More particularly, in the transsistorized multivibrator circuit of this invention in which a capacitor-resistor combination, constituting a time constant circuit, is used to determine the operate time of the driven relay or relays, and in which the said capacitor functions to control the free running period of the multivibrator, the said capacitor is normally maintained at the peak potential it attains during the operating interval of the multivibrator. To attain this normally charged condition, the capacitor is permanently included in a series circuit with a stabilizing resistor of predetermined resistance and the source of voltage which supplies the collector elements of the multivibrator transistors. The use of such stabilizing resistor insures instantaneous operation of the driven relays, and its ohmic value controls the length of the first pulse.

Figure 2:
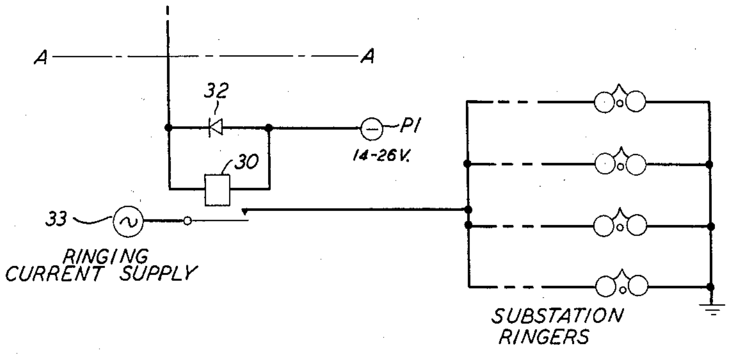

These and other features of the invention will be readily understood from the following description when read with reference to the accompanying drawing in which:

Fig. 1 is a circuit diagram of a transistorized multivibrator embodying the features of the invention. The interrupter of the figure is shown in its application as a lamp flashing or winking interrupter; and Fig. 2 is a fragmentary circuit diagram which may be substituted for that portion of Fig. 1 below the broken line A—A, and is intended to illustrate the application of the multivibrator of this invention to ringing current supply systems.

In connection with the descriptions of Figs. 1 and 2, no attempt will be made herein to include a detailed analysis of the physics of solid or surface states of semiconductors. Reference may be made to "Some Circuit Properties and Applications of N-P-N Transistors" by R. L. Wallace, Jr. and W. J. Pietenpol at page 530 of the July 1951 issue of The Bell System Technical Journal and to "Some Circuit Aspects of the Transistor" by R. M. Ryder and R. J. Kercher at page 367 of the July 1949 issue of The Bell System Technical Journal for explanation of the action of certain junction and point contact type transistors in typical circuit applications. Briefly, the transistor, in one of its forms, may be described as a body of semiconductor material having two spaced electrodes, emitter and collector, making operative contact therewith and whereby, when suitable circuit connections and potentials are associated with the body or base, with the emitter and with the collector, emitter current may produce an amplified collector current. Whenever the term "transistor" is used herein and in the claims it is not intended to restrict the term to any particular type of transistor disclosed, since the many types which could be used in the present invention will be apparent to those skilled in the art as a result of the exemplary disclosure.

The multivibrator circuit of this invention comprises first and second semiconductor devices T1 and T2, respectively. Each device includes a semiconducting body such as a block of germanium or other well known metallic crystal having a base electrode *b*, a collector electrode *c* and an emitter electrode *e* in contact therewith. The collector *c* of transistor T1 is connected to the power supply P by way of resistors R3 and R9 and to the upper plate of capacitor C1. Similarly, the collector *c* of transistor T2 is connected to the power source P by way of resistors R4 and R9 and to the lower plate of capacitor C2. The lower plate of capacitor C1 is connected to the base *b* of transistor T2 and to ground by way of the stabilizing resistor R8. The upper plate of capacitor C2 is connected to the base *b* of transistor T1 and, by way of resistor R7, to the contacts of start key ST. The cross connections of the collector of each transistor to the base of the other transistor by way of the capacitors C1 and C2 render the multivibrator "free running." The emitter *e* of transistor T1 is connected to the start key ST by way of resistor R5 while the emitter *e* of transistor T2 is connected to the base *b* of a third transistor T3 by way of resistor R6. Resistor R7 is interposed between the junction of base *b* of transistor T1 and the upper plate of capacitor C2. The multivibrator in its general configuration is of the Eccles-Jordan type.

The windings of relays 20 and 21 are connected mutually in parallel in the collector circuit of the transistor amplifier T3 which includes the power source P'. The diode 22 is shunted across the winding of each of the relays 20 and 21 and serves to reduce the inductive peak voltages generated in the relay windings. The relay 20 is illustrated, merely for exemplary purposes, as controlling the application of tone current to a load circuit *d* for any utilitarian purpose such as to supply busy tone in a telephone system. The relay 21 is illustrated as controlling the flashing of lamp signals LS such as are employed at subscriber stations in key telephone and similar systems. Relays 20 and 21 are of the mercury contact type.

The transistor T3 which comprises the usual electrodes, emitter *e*, collector *c* and base *b* is a current amplifier which operates the relays 20 and 21 under the control of the emitter current of transistor T2.

It is not deemed necessary to describe in complete detail the operation of a free-running multivibrator of the Eccles-Jordan type since such operation is well known. However, a brief explanation is deemed desirable and for this purpose it will be assumed that the circuit is operating with the transistor T1 conducting current heavily while the second transistor T2 is conducting current lightly. In this immediate explanation, the stabilizing resistor R8 and its function are ignored and will be covered hereinafter. Under the assumed conditions, the collector voltage of the transistor T1 increases in a positive direction due to the voltage drop across resistors R3 and R9. The capacitor C1 discharges the negative charge previously accumulated during the preceding half cycle through resistor R8. When the collector current of the second device T2 increases slightly, the voltage at the collector electrode of device T2 will go in a positive direction. This rise of the collector voltage is impressed through capacitor C2 to the base electrode of device T1 causing a rise in such voltage. However, as soon as the voltage of the base electrode of device T1 rises, the collector current of T1 will decrease due to the decreased positive potential between the emitter and base electrodes. This change in current causes a drop of the voltage of the collector electrode of T1 which is now impressed through capacitor C1 on the base electrode of the device T2 causing a decrease in the voltage of the base electrode. This produces, in turn, a still further increase in the collector current of device T2 so that this device will very rapidly conduct current heavily while the device T1 will conduct very lightly. This condition maintains only until capacitor C1 becomes negatively charged. At the same time, capacitor C2 is discharged through base resistor R7 so that the voltage of the base electrode of T1 will also fall, together with that of the collector electrode of T1. Eventually, the potential between the collector electrode of T1 and the associated base electrode becomes sufficiently large and the potential between the emitter electrode of device T2 and its corresponding base electrode becomes sufficiently positive to again increase the collector current of device T1, whereupon device T1 will again quickly reach its stable state of heavy current conduction while device T2 will conduct comparatively lightly. This cycle of operations repeats itself and is characteristic of the "flip-flop" action of the free running multivibrator of the Eccles-Jordan type. The relays 20 and 21 which respond to the current in the emitter circuit of transistor T2 accordingly are intermittently operated.

In the immediately preceding description it was assumed that the multivibrator was in operative condition. It will be understood however that no attempt was made to stress the starting characteristics of the circuit. It is apparent however, that the first pulse delivered by the multivibrator will be of a relatively prolonged duration and will not be of the same length as subsequently delivered pulses when the circuit is fully operating. In the multivibrator circuit of this invention it will be noted that, on open circuit, that is, with the start switch ST open, a voltage divider circuit including the power source P, resistors R9, R1, and stabilizing resistor R8 is maintained, and that the capacitor C1 and resistor R3 are connected across the resistor R1. The capacitor C1 is thus maintained charged to a predetermined potential, the value of which can be determined by the resistance value given to stabilizing resistor R8. Actually, the constants of the stabilizing circuit are so chosen that the potential on capacitor C1 when the start switch ST is open circuited is equal to the peak potential reached by the capacitor C1 during the operation of the multivibrator. It becomes apparent, therefore, that immediately coincident with the closure of the start switch ST, the potential on the base electrode of device T2 is such as to cause the device to instantaneously transmit a first pulse of the same magnitude and duration as subsequent pulses delivered thereby. The emitter current traversing resistor R6 is amplified in T3 and operates the parallel connected relays 20 and 21 which function accordingly, to intermittently close the load circuit *d* and/or the circuits to such lamp signals as are indicated at LS. The lamps, therefore, will be operated at the frequency determined by the constants of the multivibrator circuit. Similarly, the load circuit *d* would be supplied with tone current from the source 23 at the same frequency. It is apparent that the capacitor C1 and resistor R1 combine to control the operate time of the relays 20 and 21 while the capacitor C2 and resistor R2 combine to control the release time of the relays. It is also apparent that the emitter current of T1 does not traverse the windings of the illustrated relays 20 and 21 as it finds a direct path to ground by way of the switch ST.

In Fig. 2 a single relay 30 and parallel connected diode 32 replaces the parallel relays 20 and 21 and diode 22 of Fig. 1 and functions under control of the multivibrator of this invention to supply ringing current from the source 33 to a load circuit which may comprise the telephone ringers or audible signal devices at subscriber stations.

A multivibrator circuit of the configuration shown in Fig. 1, when employed as a ringing interrupter to supply ringing current to the subscriber telephone ringers at periodic one-second intervals followed by three-second off periods may be constructed as shown with components having the following specifications:

| | |
|---|---|
| Resistor: | |
| R1 | 46,400 ohms. |
| R2 | 215,000 ohms. |
| R3 | 10,000 ohms. |
| R4 | 15,000 ohms. |
| R5 | 470 ohms. |
| R6 | 1,500 ohms. |
| R7 | 100,000 ohms. |
| R8 | 22,000 ohms. |
| R9 | 3,300 ohms. |
| Capacitor: | |
| C1 | 40 mf. |
| C2 | 40 mf. |
| Transistors: | |
| T1, T2, T3 | Western Electric Company Type 7A p-n-p junction transistors. |
| Relay **30** | Western Electric Company Type 276. |
| Diode **32** | Western Electric Company Type 400A. |

The multivibrator circuit of Fig. 1 when used as a winking interrupter to light the lamps at telephone subscriber stations at half-second intervals followed by 25 millisecond off periods may be constructed as shown with components having the following specifications:

| | |
|---|---|
| Resistor: | |
| R1 | 38,300 ohms. |
| R2 | 316,000 ohms. |
| R3 | 681 ohms. |
| R4 | 3,900 ohms. |
| R5 | 470 ohms. |
| R6 | 330 ohms. |
| R7 | 430,000 ohms. |
| R8 | 100,000 ohms. |
| R9 | 2,200 ohms. |
| Capacitor: | |
| C1 | 2 mf. |
| C2 | 40 mf. |

| | | |
|---|---|---|
| Transistors: | | |
| T1 | Western Electric Company Type 7A p-n-p junction transistors. | |
| T2 | | |
| T3 | | |
| Relay: | | |
| 20 | Western Electric Company Type 276. | |
| 21 | | |
| Diode 22 | Western Electric Company Type 400A. | |

The multivibrator of Fig. 1 when used as a flashing interrupter to light the lamps at telephone subscriber stations at periodic half-second intervals followed by half-second off periods may be constructed as shown with components having the following specifications:

| | |
|---|---|
| Resistor: | |
| R1 | 26,100 ohms. |
| R2 | 26,100 ohms. |
| R3 | 3,300 ohms. |
| R4 | 3,300 ohms. |
| R5 | 470 ohms. |
| R6 | 470 ohms. |
| R7 | 56,000 ohms. |
| R8 | 56,000 ohms. |
| R9 | 3,300 ohms. |
| Capacitor: | |
| C1 | 40 mf. |
| C2 | 40 mf. |
| Transistors: | |
| T1 | Western Electric Company Type 7A p-n-p junction transistors. |
| T2 | |
| T3 | |
| Relay: | |
| 20 | Western Electric Company Type 276. |
| 21 | |
| Diode 22 | Western Electric Company Type 400A. |

What is claimed is:

1. An interrupter circuit for intermittently operating signal devices comprising first and second transistors each having base, collector and emitter electrodes, a first capacitor connecting the collector electrode of said first transistor to the base electrode of the second transistor, a second capacitor connecting the collector electrode of said second transistor to the base electrode of said first transistor, a start switch, a source of supply potential, means effective incident to the operation of said switch for applying biasing potentials to the electrodes of said transistors whereby said circuit operates as a free-running multivibrator and said first capacitor attains a peak potential of predetermined magnitude, means effective prior to the operation of said switch for maintaining said first capacitor at the said peak potential of predetermined magnitude, said means comprising a resistor connecting one plate of said capacitor and the base electrode of said second transistor to ground and the other plate of said capacitor to said source of supply potential, and signal control means included in the emitter circuit of said second transistor.

2. An interrupter circuit according to claim 1 in which the ohmic value of said resistor is such as to insure the first driving pulse delivered by said circuit being of the same length as subsequent pulses delivered thereby.

3. An interrupter circuit according to claim 1 in which the emitter circuit of said second transistor includes a current amplifier.

4. An interrupter comprising a multivibrator circuit having a first and a second semiconductor device, each including a transistor having a base electrode, a collector electrode and an emitter electrode, a capacitor interconnecting the collector electrode of the first device with the base of the second device, a capacitor interconnecting the collector electrode of the second device with the base electrode of the first device, switching means, when operated, adapted to energize said devices by applying predetermined biasing voltages to said electrodes whereby said circuit functions as a free-running multivibrator circuit, means effective during the unoperated condition of said switching means for maintaining the first said capacitor at a predetermined potential to thereby render the multivibrator circuit immediately responsive to the operation of said switching means, and signal control means included in the emitter circuit of said second device.

References Cited in the file of this patent

UNITED STATES PATENTS

| | | |
|---|---|---|
| 2,584,990 | Dimond | Feb. 12, 1952 |
| 2,787,712 | Priebe et al. | Apr. 2, 1957 |